United States Patent [19]

Leroy

[11] 3,845,285

[45] Oct. 29, 1974

[54] AUTOMATIC FUNCTIONAL MARGIN PLOTTER

[75] Inventor: Jean-Pierre Henri Michel Leroy, Courbevoie, France

[73] Assignee: Societe Honeywell Bull (Societe Anonyme), Paris, France

[22] Filed: Feb. 28, 1973

[21] Appl. No.: 336,646

[52] U.S. Cl............................... 235/151, 340/172.5
[51] Int. Cl............................................. G06f 15/20
[58] Field of Search............ 235/151, 151.1, 151.11, 235/151.3; 340/172.5

[56] References Cited
UNITED STATES PATENTS

| | | | |
|---|---|---|---|
| 3,172,598 | 3/1965 | Carson et al................. | 235/151 UX |
| 3,393,300 | 7/1968 | Jennings et al.................... | 235/151 |
| 3,434,113 | 3/1969 | Wiley et al...................... | 235/151 X |
| 3,519,997 | 7/1970 | Bernhart et al................. | 235/151 X |

*Primary Examiner*—Joseph F. Ruggiero
*Attorney, Agent, or Firm*—Fred Jacob

[57] ABSTRACT

An automatic system operation margin plotter using two parameters is provided which is applicable to the operational margins of an electronic memory using two power supply sources. The device is made up of a logic circuit which computes the values of the various pairs of parameters to be applied to the system in order to test its operation and an operation detector connected to a margin overstep detector for point-to-point scanning of vectors contained in lines evenly distributed within an area representing the step-by-step variations between the limit values (XmYm) and ($X_M$, $Y_M$) of the parameters.

Each vector oversteps the assumed margin only once in the sense opposite to that of the previously scanned vector and its edge is located at the first point scanned after each overstepping of the margin. A circuit controlling the margin plotting element connects, in succession, the end of a vector located in the operating area with the last point scanned on the next vector located in this same area.

11 Claims, 6 Drawing Figures

AUTOMATIC FUNCTIONAL MARGIN PLOTTER

BACKGROUND OF THE INVENTION

The present invention is concerned with an automatic plotter of a functional margin of a system depending on two parameters.

The invention, for example, concerns a system consisting of a set of electric circuits fed by various sources of variable voltage, in given intervals. The different values of feed voltage which one may group to make the system work permit the definition of its functional margin. To determine this margin, one tests the system by varying each parameter in the variation interval allowed. The step, that is the interval between two consecutive values of the same parameter, is a function of the desired precision. If that precision as desired is high, and if the parameter may vary in an extended interval, the determination of the functional margin of a system is a very long operation.

It is feasible by means of automatic instruments to avoid the manual operations necessary for the test of the system and the point-by-point scanning of the margin to be defined. These instruments permit one to apply to a test circuit all values allowed by each parameter through use of a control circuit linked with said test circuit of the system. They also make it possible to determine graphically, by a plotter connected with the test circuit, the points representative of the state of the system for a pair of the respective values of both parameters.

In this manner one may save a substantial amount of time in the determination of functional margins. The plotters, however, require the scanning of a significant number of points if the number of systems under consideration is high or if these systems depend on a number of more than 2 parameters, or, finally, if the parameters vary over widely extended intervals. They are, in fact, conceived in such a way that all points of the functional zone are systematically scanned. If one wishes to accelerate the operation of these plotters one has to increase the step, that is, reduce the precision. In other words, one has to compromise between an acceptable precision and the restrictions of the imposed time.

One of the objectives of the present invention is the sizable reduction, by the number of scanned points, of the determination time of a functional margin, with a precision which may be higher than that achieved with known plotters.

SUMMARY OF THE INVENTION

According to the invention, the automatic plotter of the functional margin of a system depending on two parameters X and Y involves the point-by-point scanning of straight lines evenly distributed in a space representing step-by-step variations of parameters between their extreme values (Xm, Ym) and ($X_M$, $Y_M$) and includes the following elements:

1. A circuit for computing step-by-step all values of X and Y between the extreme values and calculated along these straight lines run through one after the other in the same direction, their outputs being linked to 2. a test circuit of the system operating for each pair of calculated values (X,Y), 3. an operation detector of the system in the output of the test circuit, 4. a control circuit of an element plotter.

The plotter is characterized in that

A. the computing circuit (1) is so constructed as to restrict for a vector the amplitude of scanning along a straight line, the vector only once overstepping the assumed margin in the direction opposite to that of the previously scanned vector, B. an additional detector circuit (10) signals the overstepping of the margin during the scanning, C. all these elements are connected in the following manner:

a. the output of the operational detector (7) is linked, on the one hand, to the input of the computing circuit (1), and on the other hand, to the input of the detector (10), b. an output of the circuit (1) is tied to the input of the detector (10), c. an output of the detector (10) is connected, on the one hand, with the control circuit 16 of the element plotter (17) and, on the other hand, to the computing circuit (1), d. two outputs of the control circuit (16) are linked to the plotter (17) through the intermediary of the correction circuit (22) controlled by the detector (10) and the computing circuit (1).

BRIEF DESCRIPTION OF THE DRAWING

Other characteristics and advantages of the invention will evolve during the following description presented as a non-limiting example and with reference to the attached drawing wherein.

DESCRIPTION OF THE PREFERRED EMBODIMENT

Figure 1:
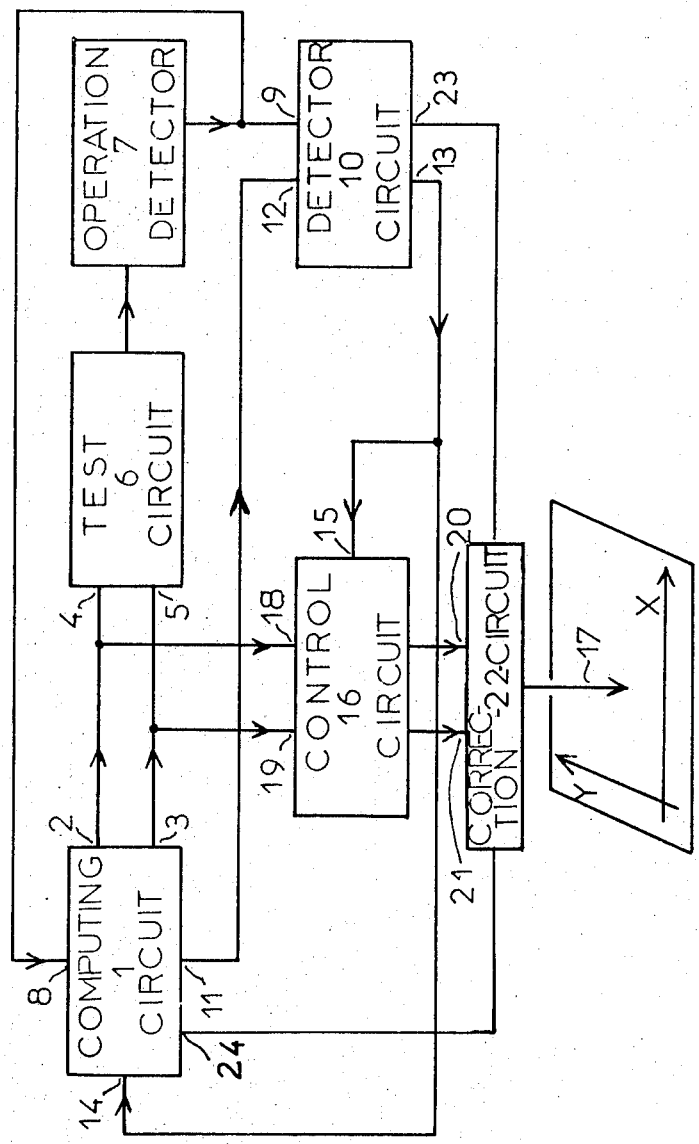
FIG. 1 is a schematic diagram of an automatic plotter according to the invention.

A computing circuit 1 of the parameters X and Y is connected in FIG. 1 by its outputs 2 and 3 with the inputs 4 and 5 of a test circuit 6 of the system under consideration. The output of this circuit 6 is linked to the input of the operation detector 7 of the system whose output is tied, partly, to an input 8 of the computing circuit 1 and, partly, to the input 9 of a detector 10 for overstepping the margin during the scanning. The output 11 of the computing circuit 1 is tied to the input 12 of the detector 10, one output 13 of which is linked, partly, to the input 14 of the computing circuit and, partly, to the input 15 of the control circuit 16 of the plotter 17 of the margin to be defined.

The outputs 2 and 3 of the circuit 1 are tied to the inputs 18 and 19, respectively, of the control circuit 16 whose outputs 20 and 21 start off a correction circuit 22 linked to the plotter 17 and controlled by the output 23 of the detector 10 and by the output 24 of the computing circuit 1.

Figure 2:
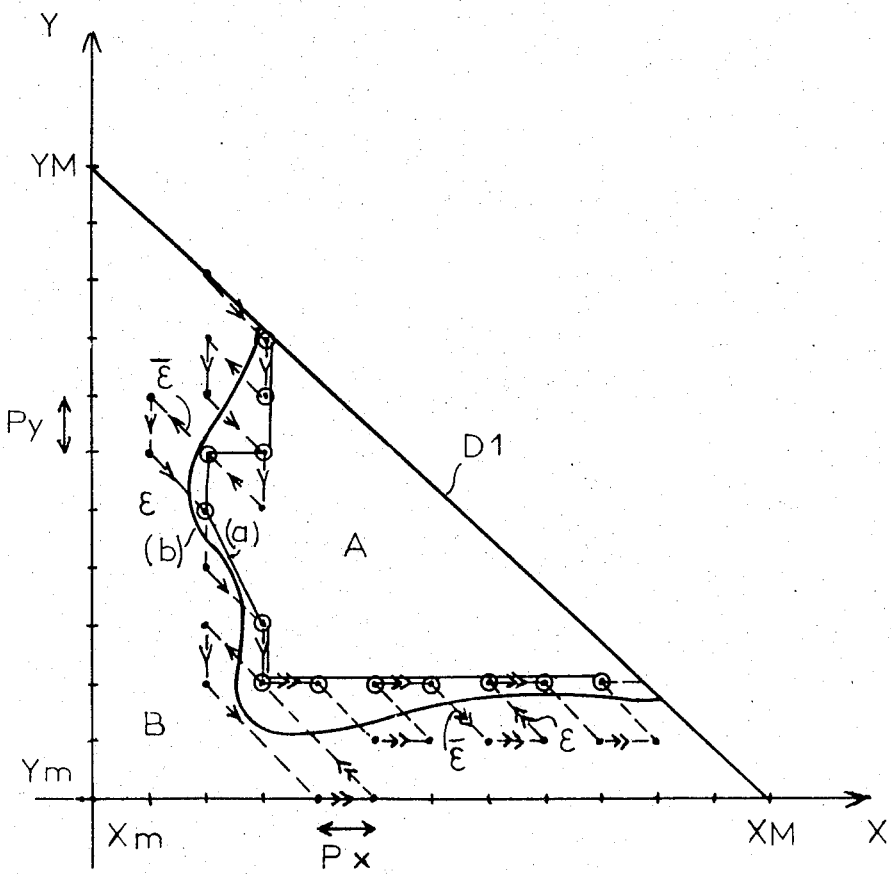
FIG. 2 is a first example of a type of space scanning, definied by the limit value of the parameters X and Y.

FIG. 2 represents two perpendicular axes for varying parameters X and Y between their limit values Xm, $X_M$ and Ym, $Y_M$, respectively. The curve (b) is the limit of the values X and Y within the zone A of the operation of the system and of the values X and Y of the zone B. The zone B is a complement of zone A in the scanning space defined by the value limits Xm, $X_M$ and Ym, $Y_M$ and, in the special case here illustrated, by the straight line D1 joining the points (Xm, $Y_M$) and ($X_M$, Ym). $P_X$ is the variation step of the parameters X, and $P_Y$ is the variation step of the parameters Y.

The method of scanning used by the plotter as a function of X and Y is defined in the following manner. From the point representative of the values (Xm,$Y_M$), corresponding to the origin of the first scanning vector, the straight line D1 is scanned in such a way that a scanned point is deduced from the previous one (X, Y), by the values of the parameters equal to X + $P_X$ and to Y − $P_y$, respectively. The first points thus scanned are in zone B. When the first scanned point of the zone A is detected (which corresponds with the end of the first vector) the value already computed for X is preserved while the parameter takes on the value Y − $P_Y$. If the point thus reached (which is at the origin of the second vector) is located at the zone A the scanning is performed in reverse direction along a line parallel to D1, that is that a new scanned point will be obtained when the parameter X is given its previous value X − $P_X$ and Y its previous value Y + $P_Y$. As soon as a point thus scanned is located in zone B the end of the second vector is reached and the scanning in this direction is halted. The following point maintains the same value of X and the preceding value of Y − $P_Y$. This method of scanning is defined by the direction of the movement $\epsilon$ and $\bar{\epsilon}$ corresponding to the direction of the passage from zone B to zone A, respectively, and in reverse direction from the zone A to zone B.

When the scanning $\bar{\epsilon}$ no longer permits passing to the zone A, the values of Y decrease up to the minimum value Ym from which point on, the scanning directions $\epsilon$ and $\bar{\epsilon}$ defined above are reversed. Thus in the right part of the curve (b) adjoining the axis X, $\epsilon$ always corresponds with the passage from the zone B to zone A, but at new values for X and Y equal to the previous value of X − $P_X$ and to the previous value of Y + $P_Y$, respectively $\bar{\epsilon}$ corresponds in the same manner to the passage from zone A to zone B, but the thus scanned points correspond with the values of X and Y equal to the previous value of X + $P_X$ and the previous value Y − $P_Y$, respectively. To pass from the direction $\epsilon$ to the direction $\bar{\epsilon}$ or vice versa, that is to pass from one vector to the following, the last value for Y is preserved and X increased by $P_X$. This type of scanning permits one to reach the line D1 for a value of X ≤ $X_M$, and to pass around the entire zone A.

The circled points of FIG. 2 symbolize the first points scanned in direction $\epsilon$ after passage from zone B to zone A and the last points scanned in direction $\bar{\epsilon}$ before passage from zone A to zone B. The curve (b), obtained by sequentially joining all of the circled points in the order of scanning, therefore represents the functional margin of the system at the precision of the approximate step $P_X$ and $P_Y$. It will be noticed that for the margin represented in FIG. 2 the scanning vectors, on the lines parallel to the limit line of the functional zone, overstep this margin only once.

Figure 3:
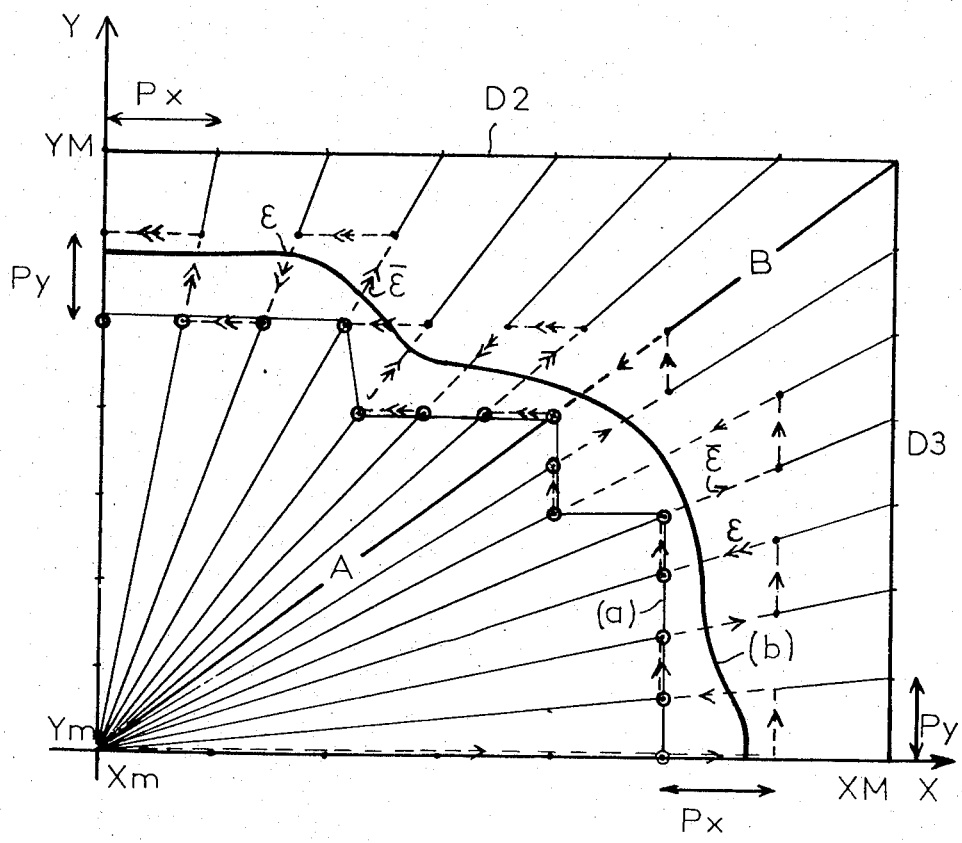
FIG. 3 is a second example of a mode of space scanning defined by the limit values of the parameters X and Y.

The type of scanning represented in FIG. 3 introduces a new step for each parameter, as a function of the scanned point reached, and of the scanning line under consideration. The curve (b) defines the operational zone A of the system and the complementary zone B in the scanning space defined by the axes of variation X and Y between their limit values Xm, $X_M$ and Ym, $Y_M$, the parallel D2 to the X axis for the value $Y_M$ and the parallel D3 to the Y axis for the value $X_M$. The scannings in the directions $\epsilon$ and $\bar{\epsilon}$ (previously defined) are done here following the lines D (i) joining the point (Xm, Ym) at different points of the line D2 (whose value for X is one of the values Xm + $i.P_X$ such as 0 ≤ i ≤ k with the integer i and $kP_X = (X_M - Xm)$ and following the lines D (j) joining the point (Xm, Ym) at the different points of the line D3 (whose value for Y is one of the values Ym + $j.P_Y$ such as O ≤ j ≤ k with the integer j and $kP_Y = Y_M - Ym$).

The scanning represented by FIG. 3 begins following the X axis at the initial point (Xm, Ym), each scanned point being deduced from the previous one by adding to the value of X the step $P_X$ until the zone B is reached.

Thus, each value for X according to this axis may be expressed by X = Xm + $i P_X$ with O ≤ i ≤ k, while Y = Ym. The passing of the X axis to the line D(1) maintains for X its last value Xm + $i P_X$, while Y takes on the value Y = Ym + $P_Y·i/k$. On the line D (2) (passing through the point ($X_M$, Ym + 2 $P_Y$) when a scanned point has the value of X = Xm + $i P_X$ its value for Y is equal to Ym + 2 $P_Y$ · i/k. Generally, a point of the line D (j), (passing through the point ($X_M$, Ym + j $P_Y$)), has the value of Y = Ym + j $P_Y$ · i/k and the value of X = Xm + i $P_X$. When the scanning is performed in the direction $\epsilon$ the value of X steps from Xm + i $P_X$ to Xm + (i − 1) $P_X$ from one point to the next and the value of Y on the line D (j), from Ym + j · $P_Y$i/k to Ym + j · $P_Y$ i − 1/k the withdrawal being by a step = j $P_y/k$. When the scanning is performed in the direction $\bar{\epsilon}$ the value of X passes from Xm + i $P_X$ to Xm + (i + 1) $P_X$ from one point to the next and the value for Y on the line D (j) from Ym + j $P_Y$ i/k to Ym + j · $P_Y$ i + 1/k, the advance being of a step = j · $P_y/k$.

To pass from the direction $\epsilon$ to the direction $\bar{\epsilon}$, that is from one vector to the next, or vice versa, if the value for X of the last scanned point of the line D (j) is equal to Xm + i $P_X$, the last point scanned on the line D (j + 1) has the same value for X while Y advances by a step equal to $P_Y$ · i/k. As to the scanning of the part which corresponds with the group of lines D (j) crossing the line D3 the values for X and Y are expressed, therefore, as a function of the relation $\rho = i/k$, or X − Xm = $\rho(X_M$ − X) and Y − Ym = $\rho$·j · $P_Y$. The value $\rho$ corresponding with a scanned point is deduced from the value of the previous point by adding or subtracting 1/k according to the direction $\bar{\epsilon}$ or $\epsilon$ of the scanning. In the same way, a scanning line is deduced from the previous one by adding a unit to the last value of j considered with O ≤ j ≤ k. It could be demonstrated in the same manner that in that part corresponding with the group of lines D (i) crossing the line D2, that is for i decreasing from k to o, the values for X and Y are expressed as a function of $\rho = j/k$, with j complete and O ≤ j ≤ k, or X − Xm = $\rho ·^i P_X$ and Y − Ym = $\rho(Y_M - Ym)$ according to the opposite direction of variation of $\rho$, here equal to $j/k$ and reverse directions of variation for $i$ and $j$ (of the lines D ($i$) and D ($j$)). The curve ($a$), joining the circled points, thus represents the functional margin of the system at an approximate precision of the steps $P_X$, $P_Y$ $\rho P_Y$, $\rho P_X$.

The margin ($a$) may also be obtained by selecting the axis Y as a departure line.

Figure 4:
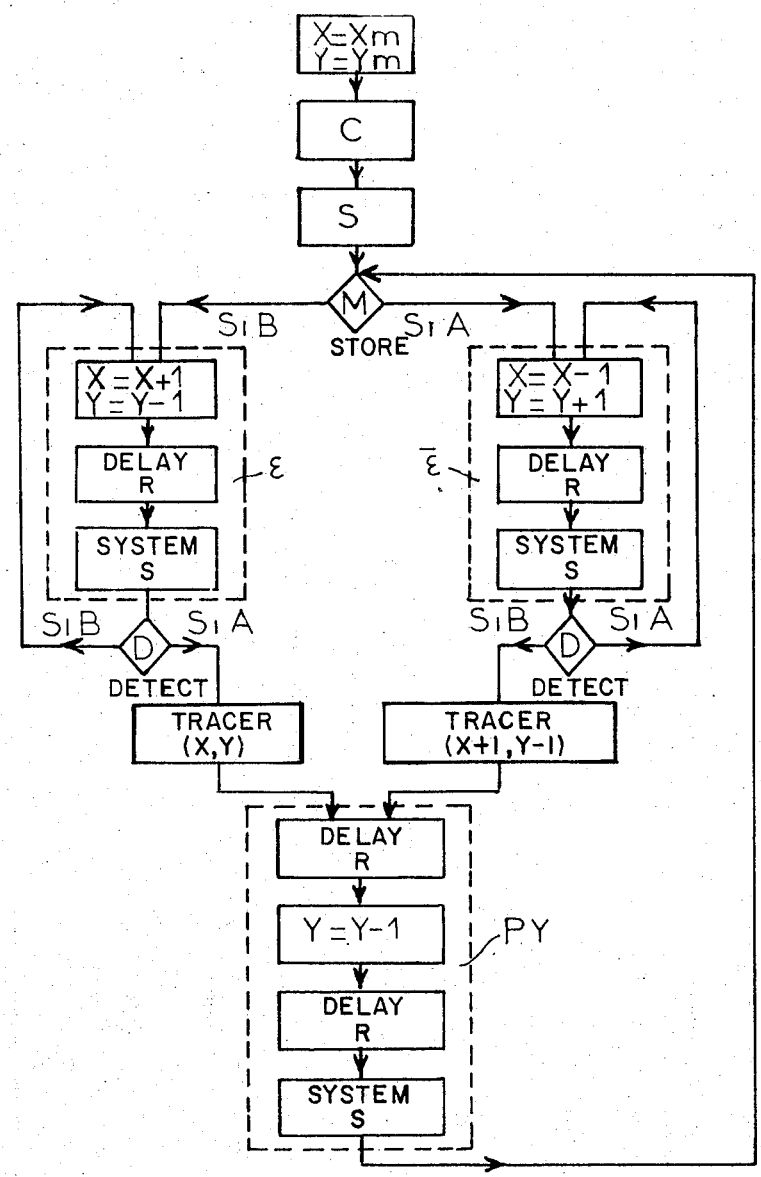
FIG. 4 is a symbolic representation of the operational phases of one part of the circuit forming the plotter according to the type of scanning shown in FIG. 2.

The symbolic diagram of FIG. 4 refers to scanning method of FIG. 2. The steps $P_X$ and $P_Y$ were selected equal in unit to simplify the written explanation and facilitate the understanding of the performed operations. The expressions of the values X and Y exhibited by FIG. 4 represent the values to be calculated on the left of the = sign, and the known values X and Y of the last scanned point on the right of the sign. Thus, the values $X = Xm$ and $Y = Y_M$ are associated with the first scanned point. A delay R is then introduced to assure the transfer of these values to be applied to the system S to test its operation. The result of this test (positive A or negative B) is stored in M. If the test is negative, that is, if the scanned point is in the zone B, the scanning is continued according to mode $\epsilon$. If the test is positive, that is, if the scanned point is in zone A, the scanning is continued according to method $\bar{\epsilon}$. In the mode $\epsilon$ the parameters X and Y take on the values $X + 1$ and $Y - 1$, respectively. A delay is then introduced by the transfer of these calculated values for the operation test of the system S. If the test permits to detect (D) that the last scanned point is always in zone B, a new cycle $\epsilon$ is performed and so on until a point of the zone A has been reached. In that case the element is drawn to the representative point of the last calculated values (X, Y) which correspond to the end of a vector of the direction $\epsilon$. A new delay R is introduced before Y is given the previous value $Y - 1$ while X maintains its last value. A new delay R occurs before the test of the system as a function of these last calculated values for X and Y. The result then replaces the previous storage M by a new scanning cycle.

If the last scanned point is in zone B the scanning method $\epsilon$ is again carried out according to the preceding description. If the point is in zone A the scanning mode $\bar{\epsilon}$ is performed. X and Y take on the values $X - 1$ and $Y + 1$, respectively. Then, a delay R precedes the operational test of system S. The result of the test (D detected) permits to the element plotter to be taken to the representative point of the values $X + 1$ and $Y - 1$ which precede the computed values X and Y, corresponding with a first point of the cycle under way in zone B.

In the opposite case, the cycle $\bar{\epsilon}$ is started again until a point in zone B is reached. After the element plotter was taken to the last scanned point in zone A, the cycle $P_Y$, corresponding with a skip of this step for Y is performed. The scanning, thereafter, is continued until a cycle $\epsilon$ produces the limit value Ym without the zone A having been crossed. The controls of X and Y are then reversed so that the cycle $\epsilon$ results in $X = X - 1$ and $Y = Y + 1$, the cycle $\bar{\epsilon}$ in $X = X + 1$ and $Y = Y - 1$ and the reversal of the controls of $-P_Y$ produces $+P_X$, that is from $-1$ into $+1$.

A symbolic diagram, similar to that of FIG. 4, in the same manner represents the main scanning phases according to the method of FIG. 3. If, as in the preceding description, the starting-off point chosen is $X = Xm$, $Y = Ym$, the first portion of the scanning corresponding with the cycle $\epsilon$ is defined by:

$$\begin{cases} X = X - P_X \\ Y = Y - \rho P_Y \end{cases}$$

with the cycle $\epsilon$ defined by:

$$\begin{cases} X = X + P_X \\ Y = Y + \rho P_Y \end{cases}$$

and with the skip of a step $\rho P_Y$ for $Y = Y + \rho P_Y$. The second part of the scanning begins with the first scanned point so that the values for X and Y are linked by the expression $Y = X \, P_Y/P_X$.

The cycles $\epsilon$ and $\bar{\epsilon}$ are then defined by:

$$\epsilon \begin{cases} X = X - \rho P_X \\ Y = Y - P_Y \end{cases}$$

$$\bar{\epsilon} \begin{cases} X = X + \rho P_X \\ Y = Y + P_Y \end{cases}$$

Between each cycle a step $\rho P_X$ is skipped by $X = X - \rho P_X$. The relation $\rho$ is equal to $i/k$ or to $j/k$ with $i$ and $j$ integers and $O < i$ and $j < k$.

Figure 5:
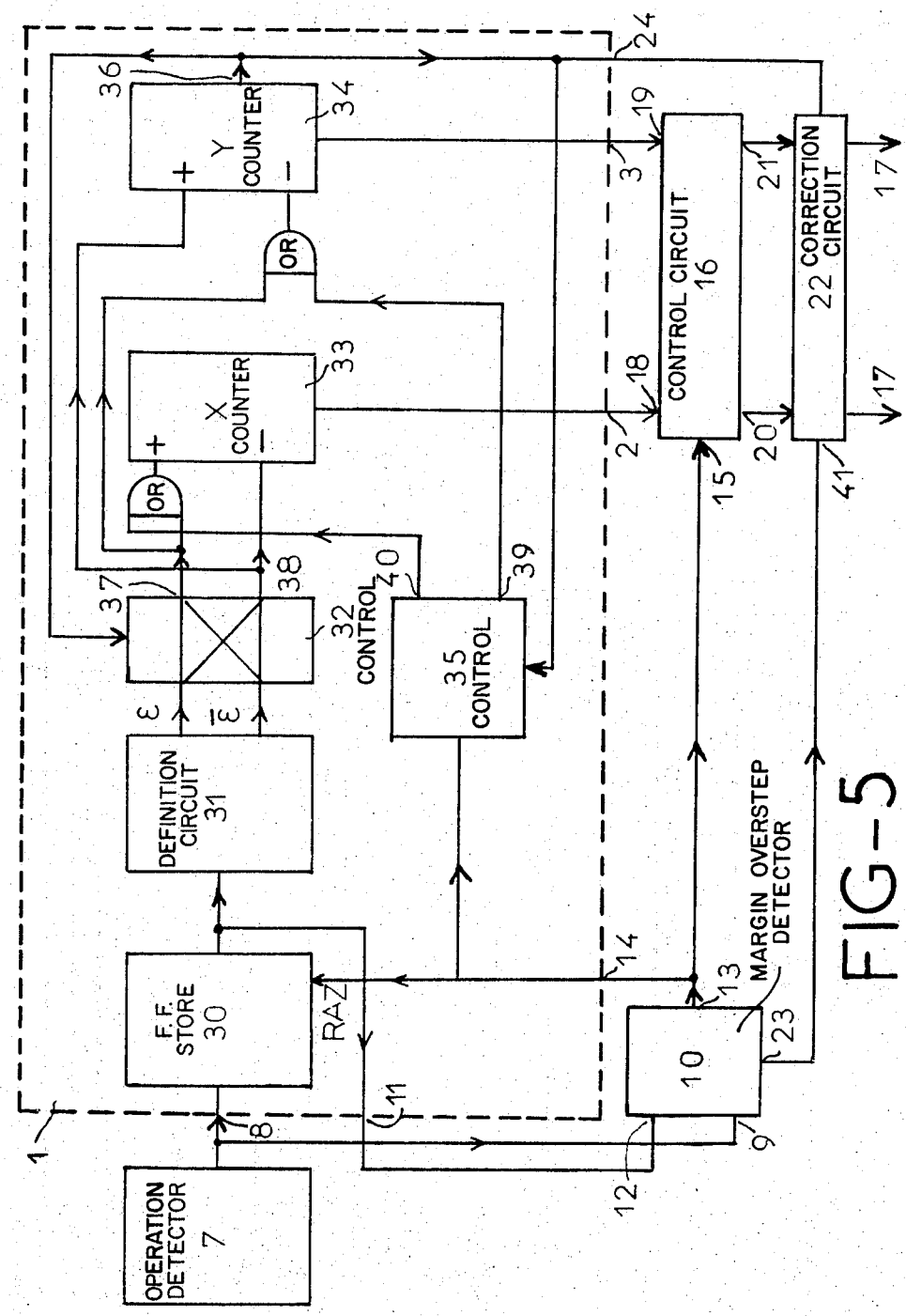
FIG. 5 is a diagram for the design of a portion of the plotter according to the scanning mode of FIG. 2.

In accordance with the scanning method of FIG. 2, the computing circuit 1 of FIG. 1 is represented in detail at FIG. 5, together with its main connections with other circuits of the automatic plotter, which is the objective of the invention. The operational detector 7 of the system is linked by the input 8 of circuit 1 to a flip-flop storage 30 of the position (in zone A or zone B) of the first point of a scanning cycle (as indicated by M in FIG. 4). The output of this flip-flop circuit 30 is tied, partly, to a definition circuit 31 of the scanning mode $\epsilon$ or $\bar{\epsilon}$ to be performed, and, partly to the input 12 of the detector of the overstepped margin 10. The connection of the input 14 of the computing circuit 1 with the outer 13 of the detector 10 permits the zero reduction RAZ of the flip-flop circuit 30.

The control circuit 32, whose two inputs are linked with the two outputs of circuit 31 respectively, enables the counters 33 and 34 of X and Y, respectively, to function according to the scanning mode defined by circuit 31. The operation of these counters is also dependent on the detector of the overstepped margin 10 whose output 13 is connected with a control circuit 35 controlling the advancement of a step for X, or for Y, after each passage from one zone to the other. This control is accomplished by means of one of two OR gates located at one of the two inputs of each counter. The outputs 2 and 3 of the counters 33 and 34 are connected with the inputs 18 and 19, respectively, of the control circuit 16 of the element plotter 17. The output 36 of the counter 34 is, moreover, linked to a second input of the circuit 35, on the one hand, and to a third input of the circuit 32, on the other hand. If the position (indicated by the detector 7) of the last point scanned corresponds with the same zone (A or B) as that (stored in the flip-flop circuit 30) of the first point of the scanning cycle ($\epsilon$ or $\bar{\epsilon}$) under way (the origin of the scanning vector considered) the comparator 10 does not detect the passage of the zone and does not send a signal either to the flip-flop 30 for the zero reduction, nor to the control circuit 16 of the element plotter, or to the control circuit 35 for withdrawal by one step $P_Y$ for Y, or for advance by one step $P_X$ for X. The signal in the input of circuit 31 is not modified and the control of the already defined direction of scanning ($\epsilon$ or $\bar{\epsilon}$) is maintained.

During the first part of the scanning, corresponding with the decrease of Y from its maximum value $Y_M$ to its minimum value $Ym$, a signal ($\epsilon$) at the output 37 of the control circuit 32 advances it by a step $P_X$ for X (in the + input of the counter X) and the withdrawal by a step $P_Y$ for Y (in the — input of the counter Y). On the contrary, a signal ($\bar{\epsilon}$) at the output 38 of circuit 32 controls the withdrawal by one step $P_X$ for X (in the — input of the counter X) and the advance by a step $P_Y$ for Y (in the + input of the counter Y). As soon as the counter Y signals by its output 36 that the parameter has reached its minimum value Ym the inputs $\epsilon$ and $\bar{\epsilon}$ of the circuit 32 are linked with the — input of counter X and the ± input of counter Y, respectively, and with the ± input of the counter X and the — input of counter Y by the intermediary of the outputs 38 and 37, respectively, of circuit 32.

As long as the parameter Y has not attained its minimum value Ym the circuit 35, since it does not receive a signal from the output 36 of the counter Y, orders from the counter Y, by its output 39, the withdrawal by a step $P_Y$ (by means of the OR gate positioned at the — input of this counter) as soon as the passage from one zone to the other is detected. When the value Ym is reached, the circuit 35 orders from the counter X, by its output 40, the advance by a step $P_X$ (by means of the OR gate positioned at the + input of this counter) as soon as the passage from one zone to the other is detected. When the passage from zone A to zone B is effected, a signal is sent by the output 23 of the detector 10 to the input 41 of the correction circuit 22.

As soon as Y has not attained its minimum value Ym the counter Y does not send a signal to circuit 22 by the output 24 of the control circuit 1 and the values X and Y (stemming from circuit 16) of the first scanned point in zone B are corrected by circuit 22 to take on the values $X + P_X$ and $Y - P_Y$, respectively. As soon as Y has reached its minimum value Ym the counter Y sends a signal to circuit 22 and the values X and Y (originating in circuit 16) of the first scanned point in zone B are corrected by circuit 22 to take on the values $X - P_X$ and $Y + P_Y$, respectively. The values computed by the computing circuit 1 are transmitted in binary form to the control circuit 16 which converts them into a decimal form to be used for the analogue control of the element plotter.

Figure 6:
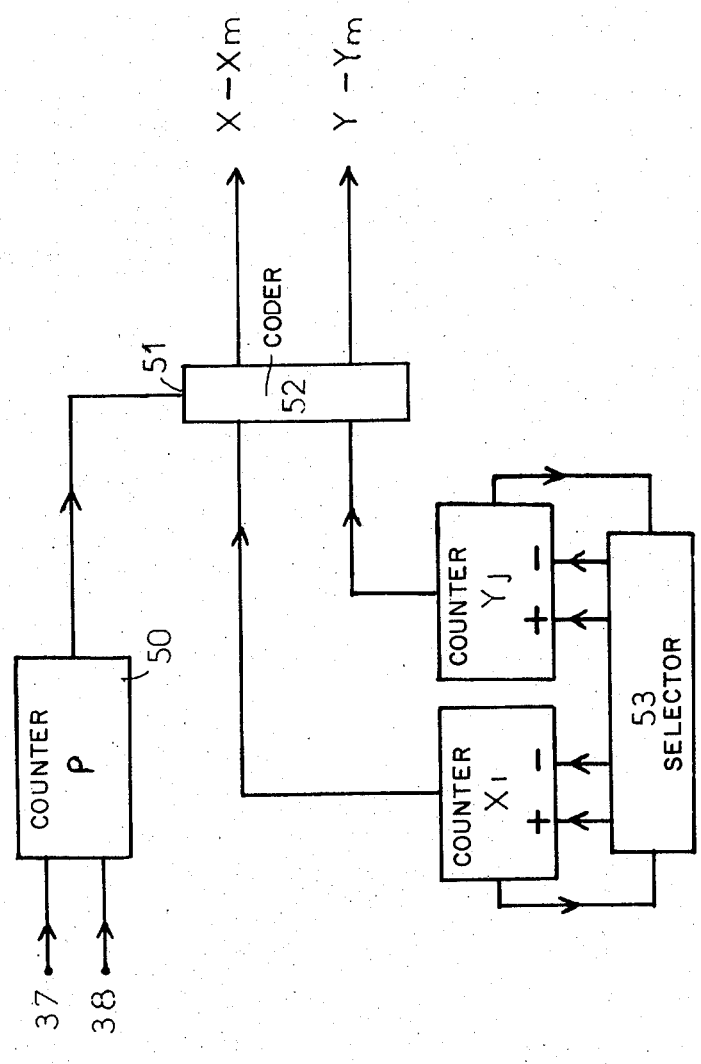
FIG. 6 is a diagram of the design of a part of the plotter according to the scanning mode of FIG. 3.

The computing circuit which was described above for the scanning mode according to FIG. 2 is modified according to FIG. 6 for the scanning method represented in FIG. 3, as far as the counters X and Y are concerned.

The outputs 37 and 38 of the circuit 32 of FIG. 5 are linked to the two respective inputs of the counter 50, of $\rho$ according to the scanning direction $\epsilon$ and $\bar{\epsilon}$. The output of this counter is linked with the input 51 of a coder 52. Two outputs of a selector circuit 53 for the scanning lines are connected with an + input and a — input, respectively, of a counter Xi and two other outputs are tied to a + input and a — input, respectively, of a counter Yj. This circuit 53 is controlled by two inputs linked to the counters Xi and Yj, respectively. A second output of each counter is connected with one of three inputs of the coder 52.

The circuit 53 and the counters Xi and Yj are conceived so as:

1. to give to $X - Xm$ and $Y - Ym$ k times the values $X_M - Xm$ and O, respectively;
2. to give to $Y - Ym$ successively all the rising values $j P_Y$ from Ym to $Y_M$ while $X - Xm = X_M - Xm$;
3. to give to $X - Xm$ successively all decreasing values $i P_X$ from $X_M$ to Xm while $Y - Ym = Y_M - Ym$; and
4. to give to $X - Xm$ and to $Y - Ym$ k times the respective values O and $Y_M - Ym$.

This variation of Xi and Yj corresponds successively with the scanning of the different points of axis X, of the line D3 (in the intersections with the lines D (j)) of the line D2 (in the intersections with the lines D (i)) and of the axis Y in the reverse direction.

Thus, the counters Xi and Yj directly furnish the pairs $(X_M - Xm, O)$, $(X_M - Xm, j P_Y)$, $(i P_X, Y_M - Ym)$ and $(O, Y_M - Ym)$. The inputs of the control circuit 53 receive a signal from these counters for each limit value of variation of $X - Xm$ and of $Y - Ym$. Thus, the coder 52 gives to its two outputs the values of $(X - Xm)$ and $(Y - Ym)$, respectively, to determine:

1.
$$\begin{cases} X - Xm = (X_M - Xm) \\ Y - Ym = O \end{cases}$$
2.
$$\begin{cases} X - Ym = (X_M - Xm) \\ Y - Ym = j P_Y \end{cases}$$
3.
$$\begin{cases} X - Xm = i P_X \\ Y - Ym = (Y_M - Ym) \end{cases}$$
4.
$$\begin{cases} X - Xm = O \\ Y - Ym = (Y_M - Ym) \end{cases}$$

The conventional circuit which allows going from the values $X - Xm$ and $Y - Ym$ to the values X and Y is not shown in FIG. 6. It should also be noted that zone A, represented in FIG. 3, may consist of any closed curve within the scanning space defined by the minimum values Xm, Ym and the maximum values $X_M$, $Y_M$. In this case the departure point must be chosen within zone A between the limit values for X and Y in such a manner that this point be the origin of the axes under consideration. In this case the automatic plotter according to the invention scans the space containing the margin following vectors which overstep it only once.

Of the two methods of scanning which were described, the second offers the advantage of providing a higher precision than that achieved with the first mode. This is due to the introduction of new steps for X and Y, less than or equal to the steps $P_X$ and $P_Y$, respectively. On the other hand, the second type of scanning may be put into effect more easily if it is realized that the conditions for the suitability of its application are less restrictive. Yet still another mode may be chosen if the position of the operational zone, in the scanning area under consideration, does not meet the desired conditions already mentioned.

In this case, too, the plotter may be designed according to the invention. It is sufficient, in fact, that the method selected be defined by a set of lines such that the scanning vectors which are located on them, do not overstep the presumed margin more than once.

For exemplary purposes, the plotter according to the invention may be used to best advantage for the control of integrated-circuit stores before they are placed into the computer circuits. These, in fact, have to be fed by two voltage sources which must not exceed set limit values, if the destruction of these stores is to be prevented. If this particular case, the functional zone to be determined corresponds with all value pairs of feeding voltage for which each memory restores all data which were transmitted to it. If one considers a store of 1024 bits, for instance, fed by two entered voltages, each in an interval of 15v, the plotter according to the invention, defined according to the first mode, described as logical scanning, permits the plotting of the margin in 10 seconds following two step $P_X$ and $P_Y$, equal to 0.06v. A conventional plotter of the same precision would determine the same margin in about 3 min. The speed of the test thus has increased by about a factor of 20 for the plotter according to the invention. Beside the qualities of speed and exactness which characterize said plotter, it also permits the plotting of several curves on the same sheet of paper, if several parameters are to be considered.

It will be noted that the completely digital search of the margin to be determined is an element of plotter speed.

Every system, generally, whose operation depends on two parameters convertible from their real form into an analogue electrical form may be linked to an automatic plotter for the determination of its functional margin.

What is claimed is:

1. An automatic plotter of the functional margin of a system dependent on two parameters, involving the point-by-point scanning of straight lines evenly distributed within an area representing step-by-step variations of the parameters between their limit values (Xm, Ym) and ($X_M$, $Y_M$) and comprising the following elements:

1. a computing circuit for step-by-step calculation of all values of X and Y, taken from inbetween the limit values and computed along said these straight lines, scanned one after the other in the same direction, their two outputs being linked to
   2. a test circuit of the system operating for each pair of the calculated values (X, Y),
   3. an operation detector of the system in the output of the test circuit,
   4. a control circuit of an element plotter, characterized in that:
      A. The computing circuit is designed so as to restrict a vector to the scanning amplitude along a straight line, the latter overstepping the presumed margin only once in the opposite direction of the previously scanned margin,
      B. an additional detector circuit signals the overstepping of the margin during the scanning,
      C. all elements are connected in the following fashion:
         a. the output of the detector (7) is linked, with an input of the computing circuit (1) and with an input of the detector (10),
         b. an output of the circuit (1) is tied to an input of the detector (10),
         c. the detector (10) is linked to the control circuit (16) of the element plotter (17) and to the computing circuit (1),
         d. two outputs of the control circuit (16) are linked with the element plotter (17) by means of a correction circuit (22) controlled by the detector (10) and the computing circuit (1).

2. An automatic plotter according to claim 1, characterized in that the computing circuit 1 includes means of determining the direction of a scanning vector as a function of the position of its origin in (or outside) the operation zone, tied by two inputs to the detectors 7 and 10 and by two outputs to means for computing the values (X, Y), associated with the end of this vector, these computing means being controlled in turn by detector 10 for the computation of the values (X, Y), associated with the origin of the vector following the scanning, and in that the plotter 17 is controlled only for the pairs (X, Y), associated with the ends of the vectors positioned inside the operation zone, and with the scanning points preceding the vector ends located within this zone.

3. An automatic plotter according to claim 2, characterized in that the means for determining the direction of a scanning vector include a flip-flop storage of the position of the vector origin to be considered in (or outside) the operation zone whose output connects the computing circuit with one of the two inputs of the detector 10 to define, as the vector end during the scanning, the first point reached outside the scanning zone.

4. An automatic plotter according to claim 1, characterized in that the computing circuit permits the calculation of each parameter according to the vectors of the lines parallel to a given limit line of the operation zone to be determined, starting off from a point of that line outside the presumed margin.

5. An automatic plotter according to claim 1, characterized in that the computing circuit permits the calculation of each parameter starting off from a point within the presumed margin according to the vectors on the lines converging at this point.

6. An automatic plotter according to claim 2 characterized in that the means of computing of the computing circuit 1 consist of two counters of X and Y with two inputs for the addition of a step and for the subtraction of a step, respectively, to the last calculated value of each parameter according to the direction of the vector in the course of the scanning, and of two OR gates before one of the two inputs of each counter, for the addition of a step to the last calculated value of one of the parameters and for the subtraction of a step from the last calculated value of the other parameter, an input of each gate being linked to a control circuit for advancement of a step to pass from the end of one vector to the origin of the next, this circuit being controlled, partly, by the detector 10 and, partly, by an output of the counter of one of the parameters when the limit value of this parameter is reached.

7. An automatic plotter according to claim 1, characterized in that the correction circuit 22 makes possible the addition of a step to, and subtraction of a step from the values, respectively, associated with the end of a vector located outside the operational zone.

8. An automatic plotter according to claim 2, characterized in that the means of calculation of the control circuit 1 include two systematic counters of the $X - Xm$ and $Y - Ym$ values associated with the different lines successively scanned, one counter of a factor $\rho$ as a function of the point under consideration on the vector in the course of the scanning, controlled by the means for determining the direction of this vector, and a coder of the values $X - Xm$ and $Y - Ym$ by the factor $\rho$ whose two outputs are tied to the control circuit 16 by means of an adder circuit producing the values X and Y to be calculated.

9. An automatic plotter of the functional margin of a system defined by orthogonally related parameters X and Y and which margin separates contiguous zones A and B, which comprises:
- computing circuit means for scanning in successive increments back and forth across said margin from one zone to the other along straight lines offset from each other in the direction of one of said parameters;
- detecting means for detecting when scanning along said straight lines passes from zone B to zone A and vice versa and controlling said computing circuit means to assure that each such straight line passes from one zone to the other; and
- control circuit means connected to said computing circuit means and to said detecting means for controlling plotting between end points of said straight lines to lie wholly within one of said zones A and B.

10. An automatic plotter as defined in claim 9 wherein the end points of said straight lines are $xi, yi - Py$ and $xi - Px, yi$ so long as such end points lie on opposite sides of said margin, where $Px$ is the spacing between successive values of X and $Py$ is the spacing between successive values of Y.

11. An automatic plotter as defined in claim 9 wherein the end points of said straight lines are $xm + iPx, ym + j Py\ i/k$ and $xm + (i-1) Px, Ym + j Py\ i-1/k$ in one direction and $xm + i Px, Ym + j Py\ j/k$ and $xm + (i+1) Px, Ym + j Py\ i + 1/k$ in the opposite direction where $Px$ is the spacing between successive values of X and $Py$ is the spacing between successive values of Y.

* * * * *